April 20, 1965 W. M. REILLY 3,179,750

PBX IN-DIALING CIRCUIT

Filed Dec. 23, 1960 2 Sheets-Sheet 1

INVENTOR
W. M. REILLY
BY Donald M Duft
ATTORNEY

PBX IN-DIALING CIRCUIT

Filed Dec. 23, 1960 2 Sheets-Sheet 2

INVENTOR
W. M. REILLY
BY Donald M Duft
ATTORNEY

United States Patent Office 3,179,750
Patented Apr. 20, 1965

3,179,750
PBX IN-DIALING CIRCUIT

William M. Reilly, New York, N.Y., assignor to American Telephone and Telegraph Company, New York, N.Y., a corporation of New York Filed Dec. 23, 1960, Ser. No. 77,990
20 Claims. (Cl. 179—27)

Figures 1, 4, 5:
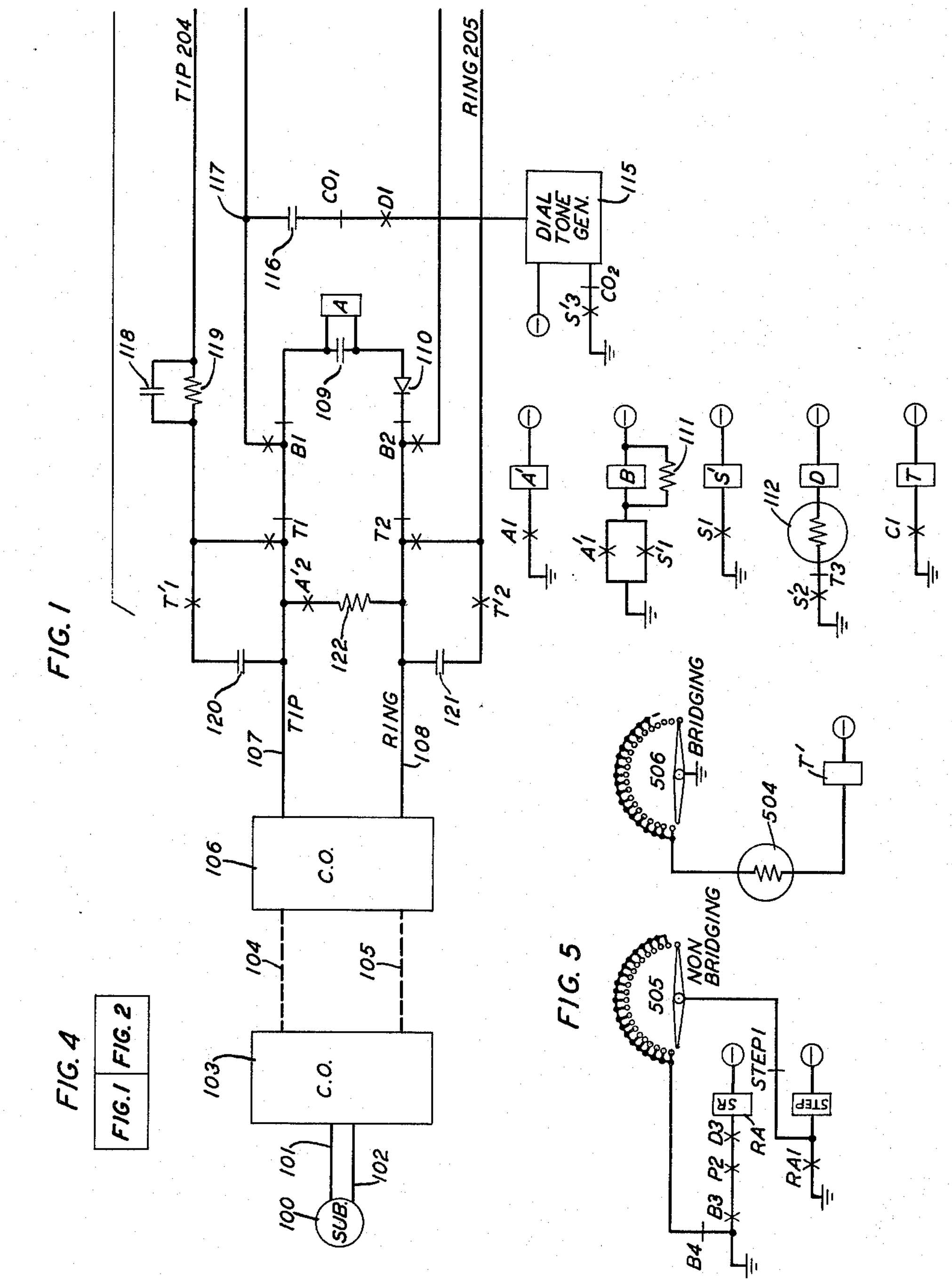

This invention relates to a telephone switching system and more particularly, to a telephone switching system having equipment at a private branch exchange (PBX) which minimizes the number of incoming calls requiring services of the local PBX operator by providing facilities whereby an outside calling party can dial into the local switch train to interconnect himself with a wanted extension.

The replacement of manual offices by automatic dial switching equipment together with the installation of recently developed customer toll dialing and call data recording facilities have equipped the nation's telephone plant so that a substantial percentage of all telephone calls, both local as well as station to station toll calls, can be completed by the calling party without operator assistance. The benefits of such automation have not, as yet, been extended to a substantial number of subscribers, namely, those served by the many PBX's now in use. The assistance of the local PBX operator is usually required for calls incoming to the PBX since, in most cases, the switching equipment thereat does not contain the necessary facilities to enable an outside calling party to dial into the local switch train. Conventional PBX equipment does not provide such facilities since once the PBX trips the ringing at the central office, the interconnecting circuits are then in what is commonly known as a talking condition. When in this condition, the subsequent dialing of additional digits by the calling party does not manifest itself by D.-C. interruptions of the PBX trunk, but instead, produces only small amplitude A.-C. transients which are superimposed upon the trunk as it is continuously held by the terminating central office. Since most PBX switching equipment is controlled by D.-C. pulses, these A.-C. transients effect no control over the switching equipment thereat.

Arrangements have been developed which permit outside callers to dial into the larger PBX's i.e., those having many hundreds or even thousands of extensions. However, such systems usually require extensive modifications of the central office so that each extension in effect becomes an individual central office line. Each extension is then assigned a separate seven-digit directory number and a call may be completed to such an extension by dialing its listed directory number rather than a number common to all extensions of the PBX.

Although such inward dialing arrangements are satisfactory for the larger PBX's, they have a number of disadvantages which prevent their use from becoming more widespread. First of all, such systems are wasteful of directory numbers since an individual seven-digit directory number is required for each extension. For example, if a PBX currently identified as CR. 3–6000 having 2000 extensions should be so equipped for inward dialing, a block of 2000 directory numbers, such as CR. 3–6000 through CR. 3–7999, would have to be assigned to this PBX. Secondly, the resultng expense of the necessary central office modification for this type of in-dialing is such that it cannot be economically justified for smaller PBX's having relatively few extensions.

It is therefore an object of the invention to provide an improved in-dialing arrangement whereby calls may be directed to a wanted PBX extension under the control of the calling party.

It is a further object of the invention to provide an improved in-dialing arrangement which requires no central office modification and which permits incoming calls to be interconnected with a wanted PBX extension under the control of the calling party without requiring the services of the local PBX operator.

It is a further object of the invention to provide equipment which may be economically used in both small as well as large PBX's and which permits incoming callers to dial into the PBX switch train to obtain a connection with a wanted extension.

In accordance with the present invention, equipment is provided which eliminates the need for operator assistance on most calls incoming to a PBX by permitting a calling party who has dialed the PBX directory number to dial into the PBX switching equipment and thereby interconnect himself with a wanted extension. Further in accordance with the present invention, equipment analogous to a line circuit is associated with each incoming PBX trunk. This equipment, after seizure by the central office, provides a low impedance shunt to trip the central office ringing; it provides dial tone to the calling line after the ringing is tripped as an indication that the dialing of the extension digits may be commenced; it provides an amplifier-converter for detecting the resulting A.-C. transient impulses on the incoming trunk as the calling party dials the extension digits and, in turn, converts these transients to D.-C. pulses; it provides means for applying the D.-C. pulses to the local PBX switch train to cause it to interconnect the incoming calling trunk with the wanted extension; it contains the necessary equipment to enable the two parties to converse; and it also contains facilities for maintaining the connection until the calling party hangs up at the termination of the call. It additionally contains a new and novel transfer circuit whereby an incoming call may be transferred, without the services of an operator, from a first to a second PBX extension upon the hanging up of the first extension followed by the dialing of the digits of the second extension by the calling party.

The present invention is advantageous in that it requires no modification whatsoever of the central office. It is further advantageous in that the only modification required at the PBX is the provision of the new line circuit of the type described hereinafter as a replacement for the operator's cord circuit or the line circuit presently provided at the PBX. The present invention is further advantageous in that no change is required in the directory number of the PBX. For example, if the aforementioned PBX having the directory number CR. 3–6000 should be modified in accordance with the present invention, it would still have the same directory number and a call could be completed to a desired extension thereat by first dialing the listed directory number followed by the dialing of the extension digits. This economy of directory numbers represents a significant advance over the prior art PBX in-dialing arrangements since it permits a PBX to be served by the number of incoming trunks which is optimum insofar as the requirements of the PBX subscriber are concerned rather than requiring an individual trunk to be provided to the central office for each PBX extension.

It is believed that the foregoing advantages of the present invention will enable any PBX, regardless of its size, to be provided with inward dialing service of the type described so that the number of calls incoming requiring operator assistance will be minimized. This will, in turn, produce further advantages in that the number of operators required to service a given size PBX will be reduced since operator assistance will then be required only on incoming calls where the calling party does not know the extension of the party with whom he desires to converse.

A feature of the invention is the provision of equipment at a PBX which permits an outside calling party to dial the digits of a wanted PBX extension after the central office and the PBX are interconnected on a talking basis.

A feature of the invention is the provision of equipment at a PBX which applies dial tone to a line serving an incoming call to indicate that the digits of a wanted PBX extension may be dialed.

A further feature of the invention is the provision of equipment at a PBX which applies dial tone to an incoming line, after it is seized by a central office, to indicate that the digits of a wanted PBX extension may be dialed.

A further feature of the invention is the provision of equipment at a PBX which applies dial tone to an incoming line, after it is connected with a central office on a talking basis, to indicate that the digits of a wanted PBX extension may be dialed.

A further feature of the invention is the provision of equipment at a PBX which trips the ringing on an incoming calling line and applies dial tone thereto to signify that the digits of a wanted extension may be dialed.

A further feature of the invention is the provision of equipment at a PBX which trips the ringing on an incoming calling line and then, after the central office and the PBX are interconnected on a talking basis, applies dial tone to the line to signify that the digits of a wanted extension may be dialed.

A further feature of the invention is the provision of equipment at a PBX which trips the ringing on an incoming calling line to interconnect the central office and the PBX on a talking basis, which applies dial tone to the line to signify that the digits of a wanted extension may be dialed, and which is responsive to the dialing of the extension digits for interconnecting the calling line with the wanted extension.

A further feature of the invention is the provision of equipment at a PBX which trips the ringing on an incoming calling line to interconnect the central office and the PBX on a talking basis, which applies dial tone to the line to signify that the digits of a wanted extension may be dialed, and which is responsive to the A.-C. transients superimposed on the calling line in response to the dialing of the extension digits for interconnecting the calling line with the wanted extension.

A further feature of the invention is the provision of equipment at a PBX which trips the ringing on an incoming calling line, applies dial tone to the line to signify that the digits of a wanted extension may be dialed, is responsive to the A.-C. transients appearing on the calling line as the extension digits are dialed for converting these transients to D.-C. circuit interruptions and is then responsive to the D.-C. interruptions for counting the groups of dial pulses and interconnecting the calling line with the wanted extension after the final digit has been dialed.

A further feature of the invention is the provision of equipment at a PBX which permits an outside calling party to dial the digits of a second wanted extension to interconnect himself therewith upon the hangup of the extension with which the calling party is currently connected.

A further feature of the invention is the provision of equipment at a PBX for permitting an outside calling party to obtain a connection to a first extension by dialing its digits and then, upon the hangup of the first extension subscriber, for permitting the calling party to interconnect himself with a second extension upon the dialing of its digits.

A further feature of the invention is the provision of equipment at a central office for applying dial tone to an incoming calling line to signify that the digits of a wanted PBX extension may be dialed, equipment responsive to the dialing of the extension digits by an outside calling party to connect the incoming line with the wanted extension, and equipment responsive to the hangup of the first extension for re-applying dial tone to the line to signify that the digits of a second wanted extension may be dialed.

Figure 2:
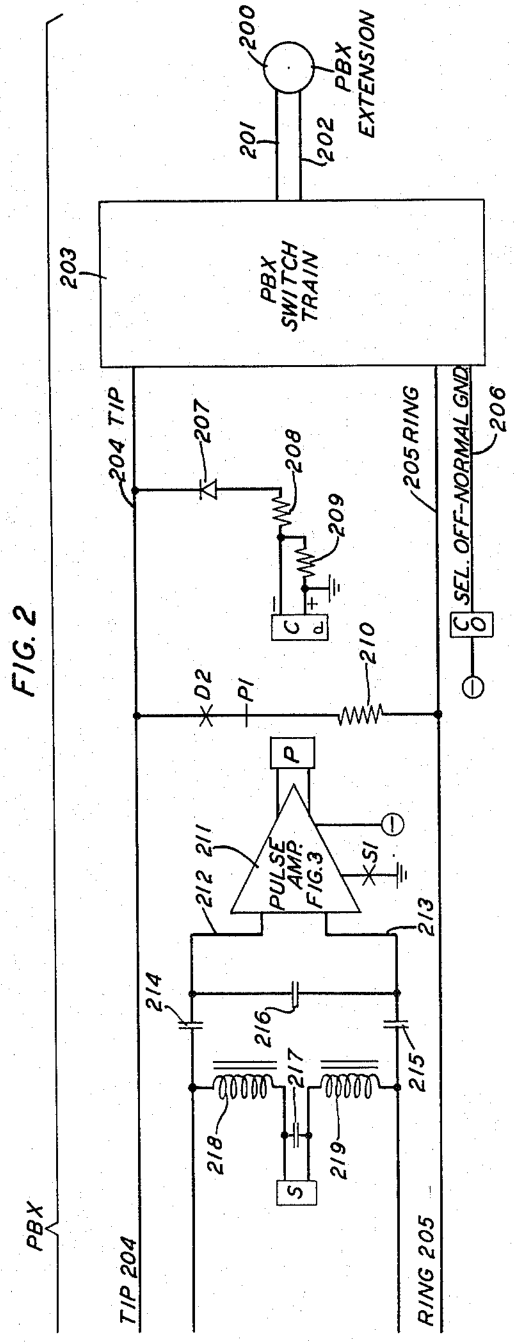
Figure 3:
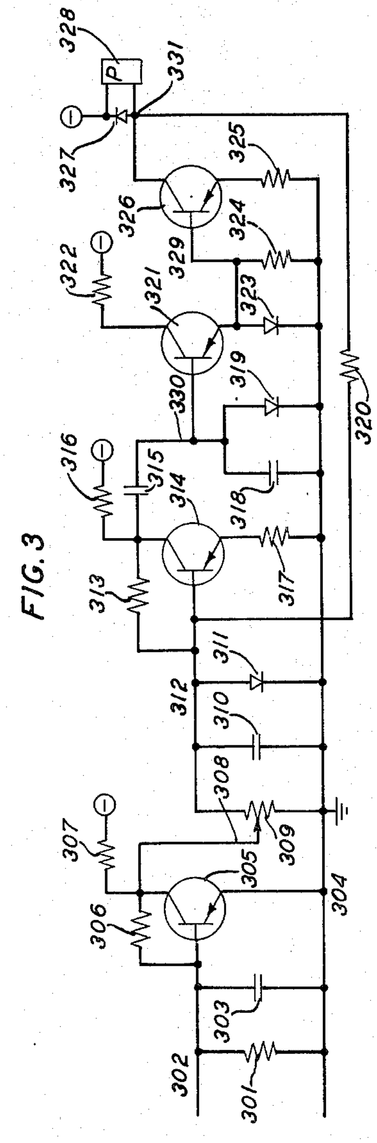

These and other objects and features of the invention will become apparent from a reading of the following description of the invention taken in conjunction with the drawings in which:

FIGS. 2 and 2 together disclose, partially in diagrammatic form a telephone system utilizing the present invention;

FIG. 3 discloses the circuit details of the pulse amplifier-converter shown in diagrammatic form in FIG. 2;

FIG. 4 illustrates how FIGS. 1 and 2 should be arranged with respect to each other; and FIG. 5 discloses a circuit for counting the number of PBX extension digits dialed for a call.

Relay contacts are shown detached from their associated windings on the drawings. Contacts which are closed when a relay is operated (make contacts) are represented by an X crossing the lines representing the connecting conductors while contacts which open when a relay is operated (break contacts) are represented by a short line intersecting the connecting conductors. The winding of each relay is designated by an alphabetical character, such as relay T for example, while the contacts associated with the relay are designated with the alphabetical designation of the winding followed by a numerical designation individual to each contact, such as contacts T1 and T2 for example.

FIG. 1 discloses a subscriber station 100 which is connected by conductors 101 and 102 to a central office 103 which, in turn, is connected by conductors 104 and 105 to a central office 106. The dashed lines representing conductors 104 and 105 indicate that the path interconnecting offices 103 and 106 may comprise either a direct trunk or may comprise one or more intermediate switching centers. The central office 106 serves the PBX by a plurality of trunks of which only a single trunk pair comprising conductors 107 and 108 is shown.

Let it be assumed that subscriber 100 desires to converse with the PBX extension 200 shown on the right hand side of FIG. 2. Subscriber 100 first lifts the receiver of his subset and dials the listed directory number of the PBX. Upon completion of the dialing of the PBX directory number, the switching equipment intermediate to subscriber 100 and the central office 106 operates to connect the calling line with an incoming trunk at office 106. Office 106 responds to the information pulsed forward from the preceding office or offices, such as office 103 and, in turn, seizes a trunk serving the PBX, such as the trunk comprising conductors 107 and 108.

Immediately following the seizure of the PBX trunk, the central office applies ringing current to it in the customary manner. The application of ringing current to conductors 107 and 108 energizes relay A, which is designed to operate on either A.-C. or D.-C. current, over the series path comprising conductors 107, break contacts T1 and B1, the winding of relay A which is paralleled by condenser 109, diode 110, break contacts B2 and T2, and conductor 108. Relay A operates over this path and at its make contacts A1 closes a path from ground to operate relay A'. Relay A' in operating closes a path over its make contacts A'1 to ground to operate relay B. The winding of relay B is shunted by resistor 111 to make it slow in releasing when its energizing circuit is opened. Relay A' in operating also closes a path through its make contacts A'2 and resistor 122 to shunt the tip and ring conductors and thereby trip the central office ringing. Relay B in operating closes its make contacts B1 and B2 and opens break contacts B1 and B2 which disconnect the winding of relay A from the incoming trunk and simultaneously connect thereto the winding of relay S in series with the inductances 218 and 219. Relay S now operates and closes its make contacts S1 to operate relay S'. Make contacts S'1 of relay S' close and complete a path from ground to maintain relay B operated. Relay A now releases since its winding is no longer connected to the incoming trunk. The release of relay A causes relay A' to release.

The operation of relay S' closes its make contacts S'2 which extend a path from ground through thermistor 112 to the winding of relay D. The temperature of the thermistor rises as the current flows through it and after an appropriate delay, reduces its resistance sufficiently so that the current in the circuit increases and operates relay D. The operation of relay D closes its make contacts D1 which complete a path from the output of dial tone generator 115, through break contacts CO1, condenser 116, terminal 117, make contacts B1 and break contacts T1 to conductor 107 of the trunk. The dial tone generator is energized from ground over make contacts S'3 and break contacts CO2 when relay S' operates and now applies dial tone to the trunk.

The dial tone is transmitted back through the switching network to subscriber 100 to notify him he may dial the digits representing the wanted PBX extension. The central office is currently in a talking condition since its ringing was tripped when contacts A'2 closed as already described and therefore the subsequent dialing of the extension digits manifests itself by the appearance of small amplitude transient A.-C. pulses on conductors 107 and 108. The A.-C. transients are applied to the input of the pulse amplifier 211 over the circuit comprising conductor 107, break contacts T1, make contacts B1, condenser 214, conductor 212, the input of pulse amplifier 211, conductor 213, condenser 215, make contacts B2, break contacts T2, and conductor 108. Pulse amplifier 211 amplifies the detected A.-C. transients resulting from the subscriber dialing, reshapes them, and applies them to the winding of relay P so that it operates and releases once for every opening of the dial contacts of subscriber 100.

The aforementioned operation of relay D closes its make contacts D2 which, in series with break contacts P1, complete a path to shunt resistor 210 across conductors 204 and 205 which comprise the tip and ring inputs of an incoming selector in the PBX switch train 203. This shunt constitutes a "seizure" of the selector which then prepares itself for the reception of dial pulses in the customary manner.

The pulsing of contacts P1 as the calling party dials causes the incoming selector as well as the rest of the equipment in PBX 203 to follow the pulses and operate in the well-known manner. When the selector steps off normal upon the reception of the first pulse, an off normal switch on the selector applies a ground to conductor 206 to operate relay CO. The operation of this relay removes the dial tone from the line by opening its break contacts CO1. The operation of the P relay for each dial pulse closes its P2 contacts to operate the RA relay of FIG. 5. The RA relay is slow to release and remains operated for the duration of each train of dial pulses. The STEP magnet operates and releases following each closure and opening of contacts RA1, thus counting the number of digits dialed on arcs 505 and 506. When the last digit is dialed, which is determined by the wiring of arc 506, ground is placed on the 3rd, 4th or 5th terminal of arc 506 to operate the T' relay through thermistor 504. The operation of the T' relay closes its T'1 and T'2 contacts connecting lead 107 to 204 through network 118 and 119 and lead 108 to 205 through network 120 and 121. This path provides means for transmitting the ringing or busy tone back to the calling customer.

When the called party answers, the polarity of the potentials applied to the tip and ring conductors 204 and 205 is reversed in the customary manner by the PBX. This causes the polarized relay C to operate through diode 207 and resistor 208. The network comprising condenser 118 and resistor 119 maintains the A.C. transmission path but prevents ground from the central office from shunting the C relay operating path when the called subscriber answers.

Relay C in operating closes its make contacts C1 which complete a path from ground to operate relay T. The operation of relay T operates its contacts T1 and T2 which transfer the incoming trunk conductors 107 and 108 from the winding of relay S to the tip and ring conductors 204 and 205 of the incoming selector in the PBX switch train. The disconnection of relay S from the incoming trunk causes it to release and in turn to release relay S'. The release of relay S' opens its make contacts S'1 to release relay B, opens its make contacts S'2 to release relay D, and opens contacts S'3 to open at another point the circuit of the dial tone generator 115. The release of the B relay closes its B4 contacts which provide a ground to arc 505 to cause the STEP magnet to operate and release through the STEP 1 normal contacts, thus restoring the selector to normal. When the selector restores to normal, ground is removed from thermistor 504 to release relay T'.

The calling and called parties may now converse since the circuit is in a talking condition with the ring conductor 108 of the trunk being directly connected to the ring conductor 205 of the incoming selector and with the tip 104 of the trunk being connected in series with condenser 119 and resistor 118 to the tip 204 of the selector. Only relay CO, C and T are operated at this time. When the called party hangs up at the end of the conversation, the central office shunt maintaining the incoming PBX selector operated is removed to cause the release of both the selector and the PBX switch train. The release of the selector opens the operating paths for relays CO and C thereby causing them to release. The release of relay C opens its make contacts C1 to release relay T.

The present invention also discloses a novel transfer circuit whereby an incoming call can be transferred from a first to a second extension without requiring the assistance of a PBX operator. For example, if the called party ascertains that the call should be transferred to a different extension, he need only inform the calling party of the new extension number and then hang up. At this time the C, CO and T relays release and restore the circuit to its normal condition. The A relay then re-operates as it does upon the initiation of a call and effects a re-operation of the circuit as aforementioned to re-apply dial tone to the line so that the calling party can dial the digits of the second extension.

The circuit details of the pulse amplifier 211 are disclosed on FIG. 3. Referring to FIG. 3 it is seen that this circuit comprises a four-stage common emitter transistor amplifier which amplifies and shapes the input signals appearing on input conductor 302, as the subscriber dials the extension digits, and in turn operates and releases relay P once for every interruption of the dial contacts.

The emitter of the first transistor, transistor 305, is grounded to obtain the maximum possible amplification of the input signals on conductor 302. Resistors 306 and 301 comprise a portion of the base bias network for the transistor. Condenser 303 is designed to be of a value which attenuates speech frequencies but yet provides little attenuation for the incoming dial signals. The amplified output of transistor 305 is taken from its collector and applied over conductor 308 to the input of potentiometer 309. This potentiometer is adjusted to provide the desired amount of gain. Condenser 310 further attenuates the undesired speech frequencies which otherwise would be applied over conductor 312 to the input of transistor 314. Diode 311 clamps conductor 312 to ground insofar as positive potentials are concerned so that transistor 314 amplifies only the negative-going signals on conductor 312. The amplified output of transistor 314 is applied through condenser 315 over conductor 330 to the input of transistor 321. Condenser 318 provides a further frequency discrimination means while diode 319 clamps the base of transistor 321 to ground for positive signals so that only the negative-going output of transistor 314 is amplified.

The output of transistor 321 is taken from the emitter which is connected to ground by diode 323. The top of diode 323 is forwardly poled with respect to ground so that only the negative-going signals on the emitter of transistor 321 are applied over conductor 329 to the base of transistor 326. The collector of this transistor is connected in series with relay P to a source of negative potential. Thus, relay P operates when the base of transistor 326 is driven negative and releases when the potential of the base reverts to its normal condition. Diode 327 protects transistor 326 from the inductive surges developed by relay P as it releases. Resistor 320 feeds back a portion of the output on the collector of transistor 326 to the base of transistor 314 in order to provide output pulses of the optimum amplitude and shape.

It is to be understood that the foregoing described arrangements are but illustrative of the application of the principles of the invention. Numerous other arrangements may be devised by those skilled in the art without departing from the spirit and scope of the invention. For example, the circuit of the present invention is described with the assumption that the PBX switch train comprises step by step equipment of the well-known type. This is not to be considered a limitation since the circuit may easily be arranged to operate in conjunction with PBX equipment of any type, such as, for example, crossbar equipment.

What is claimed is:

1. In combination, a central office and a PBX internected by a line, means at said central office responsive to an incoming call directed to said PBX for impressing ringing current on said line, means at said PBX for presenting a low impedance to said ringing current to effect its removal from said line, means at said central office responsive to the removal of said ringing current to interconnect said central office with said line on a talking basis, means at said PBX responsive to said talking interconnection for applying dial tone to said line to signify that the digits of a wanted extension may be dialed, means at said central office effective in response to the dialing of said digits for superimposing on said line A.-C. pulses representing a wanted extension at said PBX, and means at said PBX responsive to said pulses for controlling switching equipment thereat to interconnect said incoming line with the extension represented by said pulses.

2. In combination, a central office and a PBX interconnected by a line, means at said central office responsive to an incoming call directed to said PBX for impressing ringing current on said line, means at said PBX for presenting a low impedance to said ringing current to effect its removal from said line, means at said central office responsive to the removal of said ringing current to interconnect said central office with said line on a talking basis, means at said PBX responsive to said talking interconnection for applying dial tone to said line, means at said central office effective subsequent to the application of said dial tone to said line for superimposing on said line A.-C. pulses representing a wanted extension at said PBX, means at said PBX responsive to said A.-C. pulses for converting them to D.-C. circuit interruptions, and means at said PBX responsive to said interruptions for controlling switching equipment thereat to interconnect said incoming line with the extension represented by said pulses.

3. A central office and a PBX interconnected by a line, means at said central office responsive to an incoming call directed to said PBX for impressing ringing current on said line, means at said PBX for presenting a low impedance to said ringing current to effect its removal from said line, means at said central office responsive to the removal of said ringing current to interconnect said central office with said line on a talking basis, means at said PBX responsive to said talking interconnection for applying dial tone to said line to signify that the digits of a wanted extension may be dialed, means at said central office effective as said digits are dialed by the calling party for superimposing on said line A.-C. pulses representing said wanted extension at said PBX, means at said PBX responsive to said A.-C. pulses for converting them to D.-C. circuit interruptions, and means at said PBX responsive to said interruptions for controlling switching equipment thereat to interconnect said incoming line with the extension represented by said pulses.

4. A central office and a PBX interconnected by a line, means at said central office responsive to an incoming call directed to said PBX for impressing ringing current on said line, a seizure circuit at said PBX operable in response to the impression of ringing current on said line, means including said seizure circuit at said PBX for presenting a low impedance to said ringing current to effect its removal from said line, means at said central office responsive to the removal of said ringing current to interconnect said central office with said line on a talking basis, a dial tone circuit at said PBX operable in response to the operation of said seizure circuit for applying dial tone to said line to signify that the digits of a wanted extension at said PBX may be dialed, means at said central office effective as said digits are dialed for superimposing on said line A.-C. pulses representing said wanted extension, means at said PBX responsive to said A.-C. pulses for converting them to D.-C. circuit interruptions, and switching equipment at said PBX responsive to said interruptions for interconnecting said incoming line with the extension represented by said pulses.

5. In a dial switching system having a central office and a PBX interconnected by a trunk, means at said PBX responsive to the application of ringing current to said trunk by said central office upon the reception of a call directed to said PBX for applying dial tone to said trunk to signify that the digits of a wanted extension may be dialed, means at said PBX responsive to the electrical signals appearing on said trunk as said digits are dialed for converting them to D.-C. circuit interruptions, and switching equipment at said PBX responsive to said interruptions for interconnecting said incoming trunk with the extension represented by said interruptions.

6. A central office and a PBX interconnected by a trunk, means at said PBX responsive to the application of ringing current to said trunk by said central office upon the reception of a call directed to said PBX for applying dial tone to said trunk to signify that the digits of a wanted extension may be dialed, and means at said PBX responsive to the electrical signals appearing on said trunk as said digits are dialed for interconnecting said incoming trunk with the extension represented by said digits.

7. In a PBX having a trunk extending to a central office, a first relay connected to said trunk and operable in response to the application of ringing current to said trunk by the central office upon the arrival thereat of a call directed to said PBX, a second relay, means responsive to the operation of said first relay for disconnecting said first relay and connecting said second relay to said trunk, a dial tone source, means for operating said second relay, means responsive to the operation of said second relay for applying said dial tone source to said trunk to signify that the digits representing a wanted PBX extension may be dialed, a signal converter operable in response to the dialing of said digits for converting into D.C. pulses the electrical signals representing said digits and appearing on said trunk, means responsive to said D.-C. pulses for removing said dial tone source from said trunk, switching means responsive to said D.-C. pulses for preparing a path to interconnect said incoming trunk with said wanted extension, a third relay, means operable upon an off-hook condition of said wanted extension to operate said third relay, means responsive to the operation of said third relay for disconnecting said second relay from said trunk, and additional means responsive to the operation of said third relay for interconnecting said calling trunk with said wanted extension.

8. In a PBX having a trunk extending to a central office, a first relay connected to said trunk and operable in response to the application of ringing current to said trunk by the central office upon the arrival thereat of a call directed to said PBX, a second relay, means responsive to the operation of said first relay for disconnecting said first relay and connecting said second relay to said trunk, a dial tone source, means responsive to the connection of said second relay for applying said dial tone source to said trunk to signify that the digits representing a wanted PBX extension may be dialed, means responsive to the electrical signals impressed on said trunk as said digits are dialed for removing said dial tone source from said trunk, and switching means responsive to said electrical signals for interconnecting said incoming trunk with said extension.

9. In a PBX having a trunk extending to a central office, a first relay connected to said trunk and operable in response to the application of ringing current to said trunk by the central office upon the arrival thereat of a call directed to said PBX, a second relay, means responsive to the operation of said first relay for disconnecting said first relay and connecting said second relay to said trunk, a dial tone source, means responsive to the connection of said second relay for applying said dial tone source to said trunk to signify that the digits representing a wanted PBX extension may be dialed, a signal converter operable in response to the dialing of said digits for converting the electrical signals representing said digits and appearing on said trunk into D.-C. pulses, means responsive to said D.-C. pulses for removing said dial tone source from said trunk, and switching means responsive to said D.-C. pulses for interconnecting said incoming trunk with said wanted extension.

10. In a PBX having a trunk extending to a central office, a first relay connected to said trunk and operable in response to the application of ringing current to said trunk by the central office upon the arrival thereat of a call directed to said PBX, a second relay, means responsive to the operation of said first relay for disconnecting said first relay and connecting said second relay to said trunk, a dial tone source, means responsive to the connection of said second relay for applying said dial tone source to said trunk to signify to the calling party that the digits representing a wanted PBX extension may be dialed, means responsive to the electrical signals impressed on said trunk as said digits are dialed for removing said dial tone source from said trunk, switching means responsive to said electrical signals for preparing a path to interconnect said incoming trunk with said extension, a third relay, means operable upon an off-hook condition of said wanted extension to operate said third relay, means responsive to the operation of said third relay for disconnecting said second relay from said trunk, and additional means responsive to the operation of said third relay for interconnecting said trunk with said wanted extension.

11. In a PBX having a trunk extending to a central office, means operable subsequent to the application of ringing current to said trunk by said central office when completing a call to said PBX for applying dial tone to said trunk to signify that the digits of a wanted PBX extension may be dialed, means responsive to the electrical signals impressed on said trunk as said digits are dialed to connect said trunk with said wanted extension, means responsive to the subsequent on-hook condition of said extension at the end of the call to break said connection, and additional means responsive to said on-hook condition for re-applying said dial tone to said trunk to signify that the digits of a second wanted extension may be dialed.

12. In combination, a central office and a PBX interconnected by a trunk, said central office being responsive to an incoming call directed to said PBX for establishing a connection on a talking bias within said office to said trunk, means including said PBX effective upon the establishment of said talking interconnection for applying a signal to said trunk signifying that the calling party may dial the digits representing a wanted PBX extension, means including said PBX responsive to the electrical signals impressed on said trunk as said digits are dialed for interconnecting said trunk with said extension, means responsive to a subsequent on-hook condition of said extension for breaking said interconnection, and additional means responsive to said on-hook condition for applying a signal to said trunk signifying that the calling party may dial the digits of a second wanted extension.

13. In combination, a central office and a PBX interconnected by a trunk, said central office being responsive to an incoming call directed to said PBX for impressing ringing current on said trunk, means at said PBX for presenting a low impedance to said ringing current to effect its removal from said trunk, said central office being responsive to the removal of said ringing current to interconnect said central office with said trunk on a talking basis, means at said PBX responsive to said talking interconnection for applying dial tone to said trunk to signify that the digits of a wanted extension may be dialed, said central office being effective in response to the dialing of said digits for superimposing on said trunk pulses representing a wanted extension at said PBX, means at said PBX responsive to said pulses for controlling switching equipment thereat to interconnect said incoming trunk with the extension represented by said pulses, means responsive to the subsequent on-hook condition of said extension at the end of the call for breaking said interconnection, and additional means responsive to said on-hook condition for applying a dial tone to said trunk to signify that the digits of a second wanted extension may be dialed.

14. A central office and a PBX interconnected by a trunk, said central office being responsive to an incoming call directed to said PBX for impressing ringing current on said trunk, a seizure circuit at said PBX operable in response to the impression of ringing current on said trunk, means including said seizure circuit at said PBX for presenting a low impedance to said ringing current to effect its removal from said trunk, said central office being responsive to the removal of said ringing current to interconnect said central office with said trunk on a talking basis, a dial tone circuit at said PBX operable in response to the operation of said seizure circuit for applying dial tone to said trunk to signify that the digits of a wanted extension at said PBX may be dialed, said central office being operative as said digits are dialed for superimposing on said trunk A.-C. pulses representing said wanted extension, means at said PBX responsive to said A.-C. pulses for converting them to D.-C. circuit interruptions, switching equipment at said PBX responsive to said interruptions for interconnecting said incoming trunk with the extension represented by said pulses, means responsive to a subsequent on-hook condition of said extension at the end of the call for breaking said interconnection, and additional means responsive to said on-hook condition for applying dial tone to said trunk to indicate that the digits for a second wanted extension may be dialed.

15. In a PBX having a trunk extending to a central office, a first relay connected to said trunk and operable in response to the application of ringing current to said trunk by the central office upon the arrival thereat of a call directed to said PBX, a second relay, means responsive to the operation of said first relay for disconnecting said first relay and connecting said second relay to said trunk, a dial tone source, means responsive to the connection of said second relay for applying said dial tone source to said trunk to signify to the calling party that the digits representing a wanted PBX extension may be dialed, a signal converted operable in response to the dialing of said digits for converting into D.-C. pulses the electrical signals representing said digits and impressed on said trunk, means responsive to said D.-C. pulses for removing said dial tone source from said trunk, switching means responsive to said D.-C. pulses for preparing a path to interconnect said incoming trunk with said extension, a third relay, means operable upon an off-hook condition of said wanted extension to operate said third relay, means responsive to the operation of said third relay for disconnecting said second relay from said trunk, additional means responsive to the operation of said third relay for interconnecting said trunk with said wanted extension, means responsive to a subsequent on-hook condition of said extension for breaking said connection by releasing said third relay, and additional means responsive to said on-hook condition for re-operating said second relay to re-apply dial tone to said trunk as an indication that the digits of a second wanted extension may be dialed.

16. In a PBX having a trunk extending to a central office, means operable subsequent to the application of ringing current to said trunk by said central office when extending a call to said PBX for applying dial tone of said trunk to signifying that the digits of a wanted PBX extension may be dialed, means responsive to the electrical signals impressed on said trunk as said digits are dialed to connect said trunk with said wanted extension, means responsive to a subsequent on-hook condition of said extension at the end of the call to break said connection, additional means responsive to said on-hook condition for re-applying said dial tone to said trunk to signify that the digits of a second wanted extension may be dialed, and means responsive to the electrical signals impressed on said trunk as the digits of said second extension are dialed for interconnecting it with said trunk.

17. In a switching system having a central office, a PBX, a PBX trunk circuit, and a trunk interconnecting said office and said trunk circuit, said office being effective upon the receipt of a call directed to said PBX for applying ringing current to said trunk and being subsequently effective when the ringing is tripped by the PBX for establishing a talking connection over said trunk to said trunk circuit; means in said trunk circuit operative in response to the presence of ringing current on said trunk for tripping the central office ringing, means in said trunk circuit responsive to the operation of said tripping means for applying a dial tone to said trunk signifying that a calling party may dial the digits of a desired PBX extension, and means including said PBX responsive to the electrical signals impressed on said trunk as said digits are dialed for interconnecting said trunk with said extension.

18. In a switching system having a central office, a PBX, a PBX trunk circuit, and a trunk interconnecting said office and said trunk circuit, said office being effective upon the receipt of a call directed to said PBX for applying ringing current to said trunk and being subsequently effective when the ringing is tripped by the PBX for establishing a talking connection over said trunk to said trunk circuit; means in said trunk circuit operative in response to the presence of ringing current on said trunk for shunting said trunk to trip the central office ringing, means in said trunk circuit responsive to the operation of said tripping means for applying dial tone to said trunk signifying that a calling party may dial the digits of a desired PBX extension, means in said trunk circuit responsive to the dialing of said digits for converting to D.-C. pulses the A.-C. pulses appearing on said trunk as a consequence of said dialing, and means including said PBX responsive to said D.-C. pulses for interconnecting said trunk with said extension.

19. In a switching system having a central office, a PBX, a PBX trunk circuit, and a trunk interconnecting said office and said trunk circuit, said office being effective upon the receipt of a call directed to said PBX for applying ringing current to said trunk and being subsequently effective when the ringing is tripped by the PBX for establishing a talking connection over said trunk to said trunk circuit; means in said trunk circuit operative in response to the presence of ringing current on said trunk for shunting said trunk to trip the central office ringing, means in said trunk circuit responsive to the operation of said tripping means for applying dial tone to said trunk signifying that a calling party may dial the digits of a desired PBX extension, means including said PBX responsive to the dialing of said digits for converting to D.-C. pulses the A.-C. pulses appearing on said trunk as a consequence of said dialing, means including said PBX responsive to said D.-C. pulses for interconnecting said trunk circuit with said extension, and additional means including said PBX operative upon an off-hook condition at said desired extension for interconnecting said trunk and said extension.

20. In a switching system having a central office, a PBX, a PBX trunk circuit, and a trunk interconnecting said office and said trunk circuit, said office being effective upon the receipt of a call directed to said PBX for applying ringing current to said trunk and being subsequently effective when the ringing is tripped by the PBX for establishing a talking connection over said trunk to said trunk circuit; a first relay in said PBX trunk circuit normally connected to said trunk and operable in response to the presence of ringing current thereon, a contact closable upon the operation of said first relay for shunting said trunk to trip the ringing at said central office, means responsive to the operation of said first relay for disconnecting it from across said trunk, a second relay in said trunk circuit, means responsive to the operation of said first relay for connecting said second relay across said trunk, means including said trunk for operating said second relay, means responsive to the operation of said second relay for applying dial tone to said trunk signifying that the digits of a wanted PBX extension may be dialed, means responsive to the electrical signals impressed on said trunk as said digits are dialed for interconnecting said trunk circuit with the called PBX extension represented by said digits, and means responsive to an off-hook condition at said called extension for interconnecting it with said trunk.

References Cited by the Examiner

UNITED STATES PATENTS

| | | | |
|---|---|---|---|
| 1,793,761 | 2/31 | Tilden et al. | 179—5.5 |
| 2,691,063 | 10/54 | Michelini | 179—5.5 |
| 2,791,633 | 5/57 | Jones et al. | 179—6 |

ROBERT H. ROSE, *Primary Examiner.*

WILLIAM C. COOPER, *Examiner.*